United States Patent [19]
Kondo

[11] 3,995,285
[45] Nov. 30, 1976

[54] PHOTOGRAPHIC CAMERA WITH AUTOMATICALLY CONTROLLED FILTER

[75] Inventor: Toshihiro Kondo, Chofu, Japan

[73] Assignees: Fuji Photo Film Co., Ltd.; Toshihiro Kondo, Tokyo, both of Japan

[22] Filed: May 19, 1975

[21] Appl. No.: 578,949

[30]  Foreign Application Priority Data
  May 20, 1974  Japan.................................. 49-55390

[52] U.S. Cl. ............................. 354/23 R; 352/141; 354/36; 354/202
[51] Int. Cl.² ..................... G03B 7/00; G03B 7/10; G03B 11/00
[58] Field of Search .................. 354/22, 23, 26, 36, 354/43, 44, 45, 59, 152, 202, 228, 270, 271, 354; 352/141

[56]  References Cited
  UNITED STATES PATENTS

| | | |
|---|---|---|
| 3,209,667 | 10/1965 | Coutant ............................. 352/141 |
| 3,538,335 | 11/1970 | Tartanion ...................... 352/141 X |
| 3,732,793 | 5/1973 | Tague ................................ 354/354 |

*Primary Examiner*—Joseph F. Peters, Jr.
*Attorney, Agent, or Firm*—Gerald J. Ferguson, Jr.; Joseph J. Baker

[57]  ABSTRACT

An optical filter the density of which is variable is provided in the optical path of the taking lens. The density of the filter is controlled to effect optimum exposure with freely selected aperture size and the shutter speed by means of an exposure control circuit. The density of the filter is varied by moving a filter operating member. The filter operating member is controlled by the output of an electric circuit connected with a light measuring circuit including a photodetector to measure the scene brightness.

8 Claims, 5 Drawing Figures

PHOTOGRAPHIC CAMERA WITH AUTOMATICALLY CONTROLLED FILTER

BACKGROUND OF THE INVENTION

1. Field of the Invention

This invention relates to an automatic exposure control camera, and more particularly to a photographic camera with an exposure control means wherein the aperture size of a diaphragm and the shutter speed are freely selected and the density of a filter is automatically controllled in accordance with the scene brightness.

2. Description of the Prior Art

In the conventional automatic exposure control cameras, either the aperture size of a diaphragm or the shutter speed is freely selected in advance and the other is automatically controlled by use of an exposure control circuit. In addition to this ordinary type of the automatic exposure control camera, it has also been known in the art that a combination of the aperture size and the shutter speed is automatically selected from a group of predetermined combinations thereof in accordance with the scene brightness measured by use of an exposure measuring circuit and an exposure control circuit connected therewith. In these conventional automatic exposure control cameras, only two variables, i.e., the aperture size and the shutter speed, are used to determine the exposure. The film sensitivity is of course introduced into the exposure control means as input information to determine the exposure. Therefore, if one of the two variables is preselected, the other is automatically determined by the exposure control means.

However, in the photographic technique, the aperture size has an important role beside the exposure control to determine the focal depth. Further, the shutter speed has also an important role beside the exposure control to determine the degree of blur. Therefore, it is desirable to freely select both the aperture size and the shutter speed to obtain a photograph of desirable sharpness and blur. As described hereinabove, in the conventional photographic cameras with an exposure control means, it has been impossible to freely select both the aperture size and the shutter speed.

SUMMARY OF THE INVENTION

In view of the above description and observations of the conventional photographic cameras with an exposure control means, it is the primary object of the present invention to provide a photographic camera with an exposure control means in which both the aperture size and the shutter speed can freely be selected.

Another object of the present invention is to provide a photographic camera having a density-variable optical filter which is controlled to vary its density in accordance with the scene brightness to obtain photographs of optimum exposure by use of an exposure control means.

Still another object of the present invention is to provide a photographic camera having a density-variable optical filter comprising a pair of polarization filters one of which is rotated with respect to the other to vary the density or the transmittivity thereof by an exposure control means.

A further object of the present invention is to provide a photographic camera having a density-variable optical filter the density of which is automatically controlled by means of an exposure control means in which the density of the filter is varied by moving a mechanical movable member in the camera, the amount of movement of the movable member is controlled by output current or output voltage of an electric circuit.

A still further object of the present invention is to provide a photographic camera having a density-variable optical filter the density of which is automatically controlled by means of an exposure control means in which a mechanical movable member to vary the density of the filter is moved by an electromagnetic force and completely controlled by use of an electric circuit.

The above objects are accomplished by providing an optical filter in the optical path of the taking lens the optical density or transmittivity of which is automatically varied by means of an exposure control means including a light measuring circuit in which two factors of the aperture size of a diaphragm and the shutter speed are taken into account.

In the photographic camera in accordance with the present invention, a filter operating member which is moved to vary the density of the density-variable optical filter is controlled of its amount of movement by the output current of an electric circuit connected with a light measuring circuit.

In order to move said filter operating member by the output current of an electric circuit to vary the density of an optical filter, various kinds of electric driving means can be employed such as a servomotor and a combination of a permanent magnet and an electromagnetic coil. Further, it is possible to control a stroke of a member connected with the filter operating member by use of a step cam which is engaged with a needle of an exposure meter. The member connected with the filter operating member can be manually moved by the shutter release operation.

As the density-variable optical filter, various kinds of optical filter the density or transmittivity of which can be varied such as a pair of polarization filters one of which is rotatable with respect to the other, a pair of optical pattern plates one of which is rotated or moved with respect to the other to vary or change the total amount of light passing therethrough (which will hereinafter be described in detail), and a liquid density filter the thickness of which can be varied to vary the transmittivity thereof. All these filters the density or light transmittivity of which is variable will hereinafter be referred to as "density-variable optical filter" or simply as "variable filter".

As will be understood from the above description of the filter driving means and the density-variable optical filter, the present invention can be embodied in a variety of combinations thereof.

In the present invention, it should be noted that the sensitivity of the film used must be considerably high in comparison with that of the film used in the conventional photographic cameras, since the quantity of incident light is attenuated by the variable filter. In practical use, the sensitivity of the film used in this invention should preferably be over ASA3000. As an example of such a high-sensitivity film which is commercially available, is known "TYPE 410" made by Polaroid Corporation the sensitivity of which is ASA10000.

DESCRIPTION OF THE PREFERRED EMBODIMENTS

A first embodiment of the present invention in which a servomotor and a pair of polarization filters are used as the variable filter will hereinbelow be described in detail referring to FIGS. 1 to 3.

Figure 1:
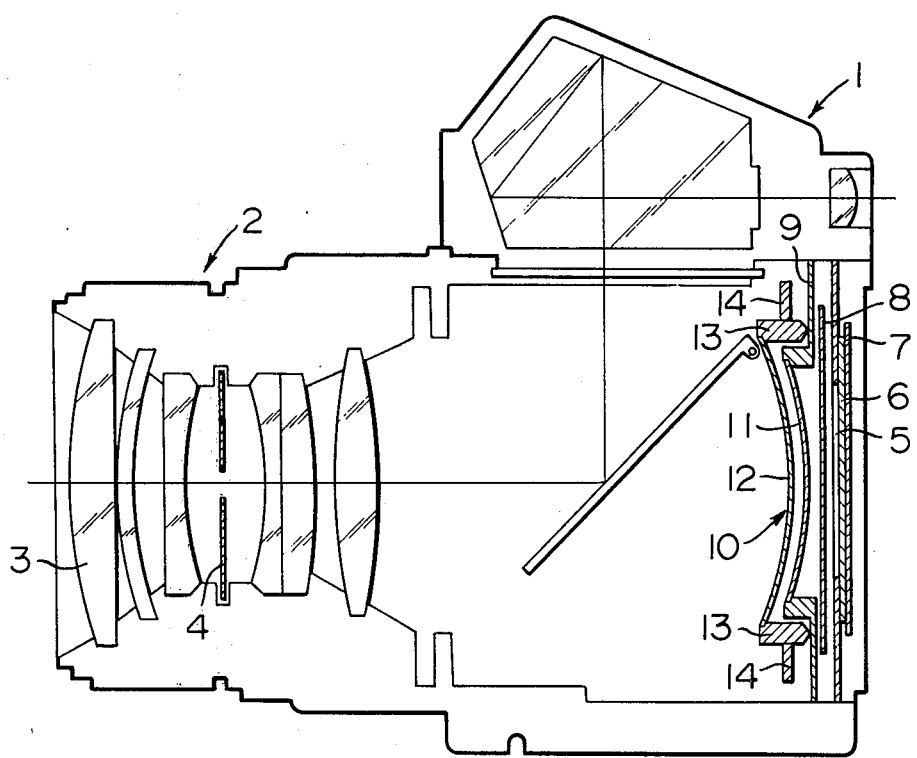
FIG. 1 is a schematic longitudinal sectional view of a photographic camera provided with a density-variable optical filter comprising a pair of polarization filters in accordance with an embodiment of the present invention.

FIG. 1 illustrates a single lens reflex camera in which the present invention is embodied. A camera body 1 is provided with a lens barrel 2 on the front face thereof. The lens barrel 2 is provided with a taking lens system 3 and a diaphragm 4. In the back of the camera body 1 is provided an aperture plate 5 on the back of which is pressed a film 6 by a film pressure plate 7. In front of the aperture plate 5 is provided a focal plane shutter 8. In front of the focal plane shutter 8 is provided a fixed plate 9 to which a variable filter 10 is mounted. The variable filter 10 is comprised of a fixed polarization filter 11 fixed to the plate 9 and a rotatable polarization filter 12 fixed to a rotatable ring 13. The rotatable ring 13 rotates about the optical axis of the taking lens 3 and supports the rotatable polarization filter 12 in parallel to the fixed polarization filter 11. The ring 13 is provided with a flange 14 on the outer periphery thereof which flange 14 is provided on the periphery thereof teeth 14a as shown in FIG. 2.

Figure 2:
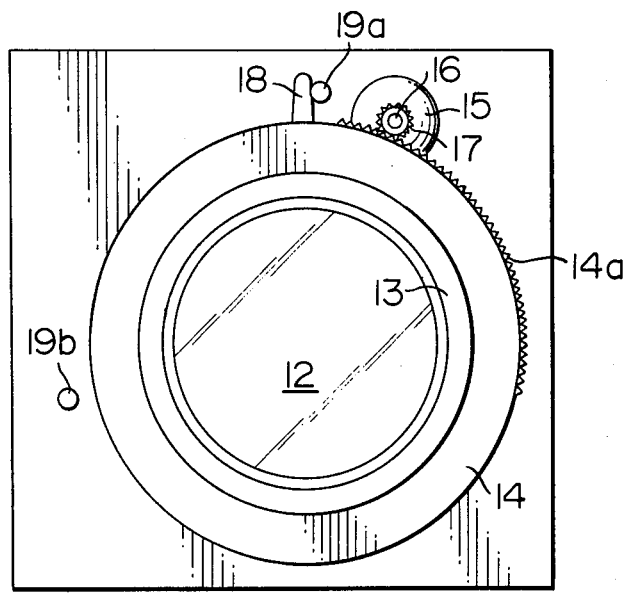
FIG. 2 is a front view showing a filter operating means for varying the density of the filter employed in an embodiment of the present invention in which a servomotor is used.

Referring to FIG. 2, the teeth 14a are meshed with a pinion 17 mounted on a shaft 16 of a servomotor 15 so that the ring 13 may be rotated clockwise or counterclockwise by the operation of the servomotor 15. A projection 18 is fixed to the periphery of the flange 14 so that the rotation of the ring 13 may be limited by two stoppers 19a and 19b on which said projection abuts. In the position as shown in FIG. 2 in which the rotatable ring 13 is in its end of the clockwise rotation and the projection 18 is in contact with the stopper 19a, the rotatable ring 13 is in the position to make the transmittivity of the filter combination 11 and 12 the maximum. As the rotatable ring 13 rotates counter-clockwise, the transmittivity of the filter combination decreases. When the projection 18 abuts on the other stopper 19b, the transmittivity of the filter combination 11 and 12 becomes the minimum. The servomotor 15 is controlled by a light measuring circuit in which a freely selected shutter speed and an aperture size of a diaphragm are taken into account together with the sensitivity of the film loaded in the camera.

Figure 3:
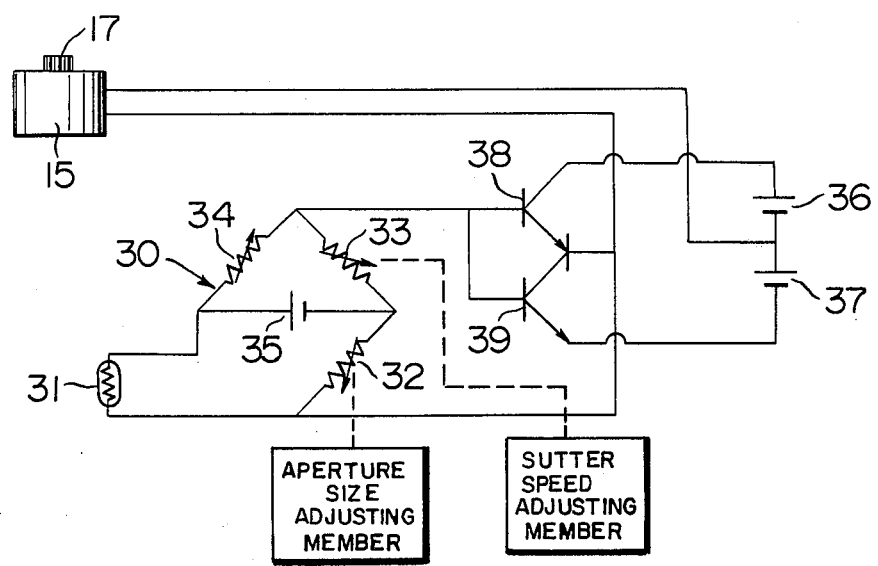
FIG. 3 is a circuit view of an example of an electric circuit for controlling a servomotor employed in one embodiment of the present invention.

As the light measuring circuit for controlling the servomotor 15, a bridge circuit 30 and an amplifier to amplify the imbalance output thereof as shown in FIG. 3 can be used. Referring to FIG. 3, a photodetector 31 such as a cadmium sulfide element is connected with three resistors 32, 33 and 34 to form a bridge circuit 30 with a D.C. source 35 connected between the connecting point between the photodetector 31 and the resistor 34 and the connecting point between the resistors 32 and 33. The three resistors 32, 33 and 34 are variable resistors which vary their resistance in accordance with the aperture size of a diaphragm, the shutter speed and the film sensitivity. Reference may be made to U.S. Pat. No. 2,222,292, FIG. 7 thereof, for a description illustrating the variation of a resistance in accordance with the setting of a shutter speed adjusting member and to U.S. Pat. No. 3,777,640, FIGS. 4–6, for a description illustrating the variation of a resistance in accordance with the setting of an aperture size adjusting member. The imbalance output of the bridge circuit 30 is amplified by transistors 38 and 39 and the servomotor 15 is driven by D.C. power sources 36 and 37 in accordance with the amplified output of the bridge circuit 30. The two output power sources 36 and 37 are for rotating the servomotor 15 selectively in two directions. Thus, the shaft 17 of the servomotor 15 is rotated clockwise or counterclockwise to control the density of the variable filter 11 and 12 in accordance with the scene brightness.

A second embodiment of the present invention will hereinbelow described with reference to FIG. 4, in which a combination of an exposure meter and a step cam is employed to control the density of the variable filter. In this second embodiment of the invention, the force to drive the filter operating member is given by manually depressed shutter release button.

Figure 4:
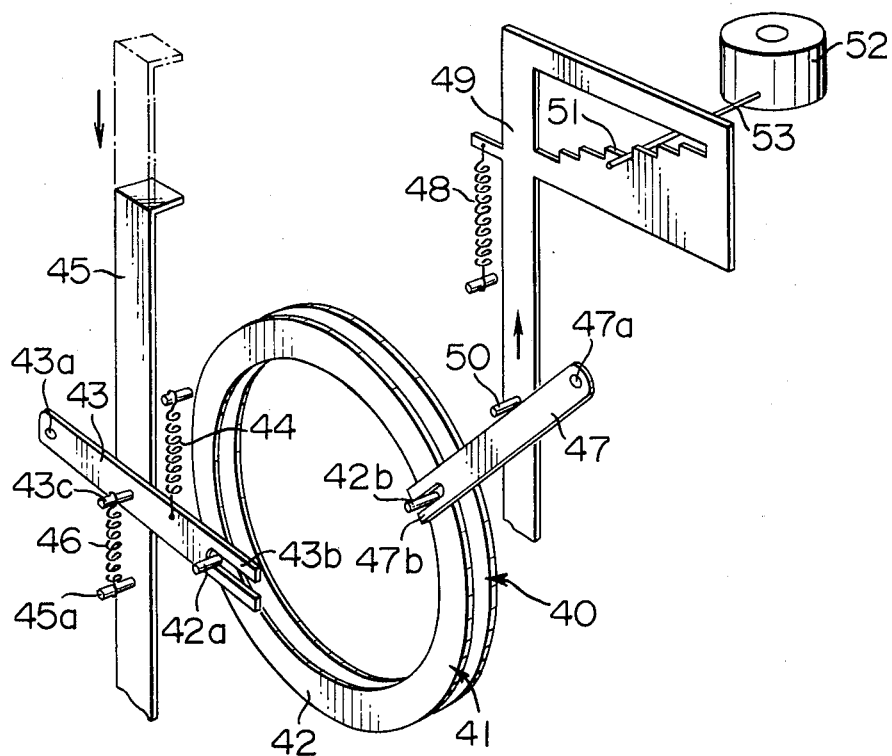
FIG. 4 is a schematic perspective view showing a filter operating means for varying the density of the filter employed in a different embodiment of the present invention in which a step cam and an exposure meter are employed.

Referring to FIG. 4, two pins 42a and 42b are fixed to a rotatable ring 42 which holds a rotatable polarization filter 41. The rotatable polarization filter 41 is located in superposition with a fixed polarization filter 40. The pin 42a is engaged with a fork end 43b of a first lever 43 the other end of which is pivotally mounted to a pivot 43a. The rotatable ring 42 is rotated counterclockwise by the clockwise swing of the first lever 43. The first lever 43 is spring-urged in the counterclockwise direction by a comparatively weak tension spring 44. The first lever 43 is provided with a pin 43c at an intermediate portion thereof. A comparatively strong tension spring 46 is tensioned between the pin 43c and a pin 45a fixed to a shutter release rod 45 so that the first lever 43 may be pulled thereby and swing clockwise when the shutter release rod 45 is depressed downward. The other pin 42b of the rotatable ring 42 is engaged with a fork end 47b of a second lever 47 the other end of which is pivotally mounted to a pivot 47a. When the rotatable ring 42 is rotated counterclockwise, the second lever 47 is caused to swing clockwise. A pin 50 fixed to a cam plate 49 which is spring-urged downward by a tension spring 48 is engaged with the upper side of the second lever 47 so that the cam plate 49 may be moved upward by the clockwise swing of the second lever 47. The cam plate 49 is provided with a step cam 51 which is engaged with a pointer needle 53 of an exposure meter 52. The upper limit of the upward movement of the cam plate 49 is determined by the angle of deflection of the pointer needle 53 of the exposure meter 52. Since the upward movement of the cam plate 49 is caused by the clockwise swing of the second lever 47 which is caused by the counter-clockwise rotation of the rotatable ring 42 holding the rotatable polarization filter 41, the position where the cam plate 49 is stopped determines the density of the filter combination 40 and 41.

The exposure meter 52 is connected with a light measuring circuit including a photodetector to receive light from the object to be photographed and variable resistors which represent the aperture size of a diaphragm, the shutter speed and the film sensitivity, respectively. Thus, the exposure meter 52 makes the pointer needle 53 swing in accordance with the brightness of the object to be photographed. Therefore, the rotatable polarization filter 41 is rotated in accordance with the scene brightness to obtain the optimum exposure.

Although in the above described two embodiments of the invention polarization filter combination is used as the variable filter, it should be noted that various light transmittivity varying means known in the art can be replaced therefor. For example, a filter turret which has several filters of different density arranged in a circle around the axis of rotation thereof can be used with one of the filters selectively put into alignment with the optical axis of the taking lens of a camera.

Figure 5:
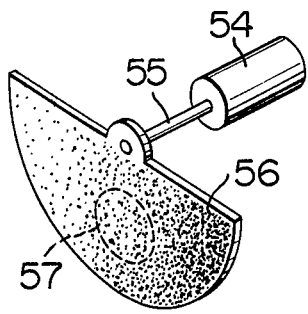
FIG. 5 is a perspective view of an example of a density-variable optical filter of simple structure which can be employed in this invention.

A third embodiment of the present invention will hereinbelow described in detail with reference to FIG. 5 in which a simple variable filter is directly fixed to an exposure meter. An exposure meter 54 is provided with a semicircular or fan-shaped filter 56 fixed to the rotatable shaft 55 thereof. The filter 56 is located in front of or behind an aperture 57 of a camera. The filter 56 is an optical filter the density of which is continuously varied from one end to the other so that the rotation thereof may effect variation in the light transmittivity for the light passing through a part thereof. Therefore, the quantity of light passing through the aperture 57 of the camera through the filter 56 is varied as the variable filter 56 is rotated by the exposure meter. The exposure meter 54 is connected with a light measuring circuit which includes a photodetector to measure the scene brightness and variable resistors for insertion of information of the aperture size of a diaphragm, the shutter speed and the film sensitivity. Principally, this embodiment is also characterized in that the scene brightness is converted to a voltage or current and the voltage or current controls a position of a movable member to vary the density of a density-variable filter.

I claim:

1. A photographic camera wherein the aperture size of a diaphragm and the shutter speed are freely selectable and the density of a filter is automatically controlled in accordance with the scene brightness comprising in combination:
    a variable diaphragm the aperture size of which is freely selectable by manual operation,
    means responsive to said diaphragm for generating a first signal indicative of the selected aperture size,
    a shutter the exposure time of which is variable and freely selectable by manual operation, means responsive to said shutter for generating a second signal indicative of the selected shutter speed, the aperture size of said diaphragm being independent of the exposure time of said shutter and vice versa,
    a light measuring circuit which measures the scene brightness and which is responsive to said first and second signals to give an output corresponding to the measured scene brightness taking the selected aperture size and the selected shutter speed into account,
    a density-variable filter located on the optical axis of a taking lens of the camera the density or light transmittivity of which is variable,
    a filter operating means for varying said density of the density-variable filter, and
    a control means connected with said light measuring circuit for operating said filter operating means in accordance with said output of said circuit to vary the density of said filter in accordance with the scene brightness.

2. A photographic camera as claimed in claim 1 wherein said density-variable filter comprises a pair of superposed polarization filters one of which is rotatable with respect to the other.

3. A photographic camera as claimed in claim 2 wherein one of said pair of polarization filters is fixed in the camera and the other of said pair of polarization filters is rotatably mounted in the camera, and said filter operating means is connected with the rotatable polarization filter to rotate the same.

4. A photographic camera as claimed in claim 1 wherein said filter operating means is a movable member which varies the density of the filter by the movement thereof, and said control means is a means for moving said movable member by a distance corresponding to said output.

5. A photographic camera as claimed in claim 4 wherein said movable member moving means is an exposure meter.

6. A photographic camera as claimed in claim 4 wherein said movable member moving means is a servomotor, the shaft thereof being fixed or connected with said movable member.

7. A photographic camera wherein the aperture size of a diaphragm and the shutter speed are freely selectable and the density of a filter is automatically controlled in accordance with the scene brightness comprising in combination:
    a diaphragm the aperture size of which is freely selectable by manual operation,
    a shutter the exposure time of which is freely selectable by manual operation,
    a light measuring circuit which measures the scene brightness and gives an output corresponding to the measured scene brightness taking the selected aperture size and the selected shutter speed into account,
    a density-variable filter located on the optical axis of taking lens of the camera the density or light transmittivity of which is variable,
    a filter operating means for varying said density of the density-variable filter said filter operating means being a movable member which varies the density of the filter by the movement thereof, said movable member being connected with a shutter release button to be moved by the depression thereof, and
    a control means conected with said light measuring circuit for operating said filter operating means in accordance with said output of said circuit to vary the density of said filter in accordance with the scene brightness, said control means being a means for moving said movable member a distance corresponding to said output.

8. A photographic camera as defined in claim 7 wherein said control means comprising a cam means connected with said movable member to control the amount of movement of said movable member by the position thereof, and an exposure meter having a swingable pointer needle which is engaged with said cam means to control the position of the cam by the angle of swing of the pointer needle engaged therewith.

* * * * *